United States Patent [19]
Fisli

[11] Patent Number: 5,627,579
[45] Date of Patent: May 6, 1997

[54] RASTER SCANNING OPTICAL SYSTEM AND METHOD FOR ADJUSTING SCAN LINE LOCATIONS ON A PHOTORECEPTOR

[75] Inventor: Tibor Fisli, Los Altos Hills, Calif.

[73] Assignee: Xerox Corporation, Stamford, Conn.

[21] Appl. No.: 350,051

[22] Filed: Nov. 29, 1994

[51] Int. Cl.⁶ .................. B41J 2/47; G01D 15/14; G01D 15/06; G03G 15/01
[52] U.S. Cl. .................. 347/225; 347/256; 347/245; 347/116
[58] Field of Search .................. 347/241, 261, 347/116, 118, 129, 134, 259, 115, 232; 355/271, 236 R; 359/204, 218

[56] References Cited

U.S. PATENT DOCUMENTS

| | | | |
|---|---|---|---|
| 2,885,924 | 5/1959 | Cahen | 359/637 |
| 4,474,422 | 10/1984 | Kitamura | 359/204 |
| 4,847,642 | 7/1989 | Murayama et al. | 347/116 |
| 4,903,067 | 2/1990 | Murayama et al. | 347/134 |
| 5,157,533 | 10/1992 | Hanamoto | 347/241 |
| 5,179,462 | 1/1993 | Kageyama et al. | 347/232 |
| 5,243,359 | 9/1993 | Fisli | 347/134 |
| 5,287,125 | 2/1994 | Appel et al. | 347/259 |
| 5,341,158 | 8/1994 | Appel et al. | 347/241 |
| 5,543,829 | 8/1996 | Fisli | 347/241 |

OTHER PUBLICATIONS

"Laser Scanning for Electronic Printing", *Proceedings of the IEEE*, vol. 70, No. 6, Jun. 1982, pp. 597–618 by John C. Urbach et al.

Primary Examiner—Mark J. Reinhart
Assistant Examiner—Raquel Y. Gordon
Attorney, Agent, or Firm—Oliff & Berridge

[57] ABSTRACT

A raster scanning optical system and method for adjusting a scan line location on a light receiving member by a desired amount. A photoreceptor receives a light beam as the photoreceptor is advancing in a slow scan direction. A polygon mirror scans the light beam across the photoreceptor at a scan line location extending in a fast scan direction. A light transmissive plate is located in the path of the light beam between the polygon mirror and the photoreceptor. The light transmissive plate is adjusted by an adjusting device to displace the scan line location on the photoreceptor by the desired amount in a direction parallel to the slow scan direction.

57 Claims, 9 Drawing Sheets

RASTER SCANNING OPTICAL SYSTEM AND METHOD FOR ADJUSTING SCAN LINE LOCATIONS ON A PHOTORECEPTOR

BACKGROUND OF THE INVENTION

1. Field of the Invention

This invention generally relates to an apparatus and method for adjusting the scan line location of a light beam on a photoreceptor. More particularly, this invention relates to multi-layer image registration in single or multipass color printers.

2. Description of Related Art

Flying spot scanners (often referred to as raster output scanners or ROSs) conventionally have a reflective multi-faceted polygon mirror that is rotated about its central axis to repeatedly sweep one or more intensity modulated beams of light across a photosensitive recording medium in a line scanning direction (known as the fast-scan direction) while the recording medium is being advanced in an orthogonal or "process" direction (known as the slow scan direction), such that the beam scans the recording medium in accordance with a raster scanning pattern. Digital printing is performed by serially intensity modulating each of the beams in accordance with the binary sample string, whereby the recording medium is exposed to the image represented by the samples as it is being scanned. Printers that sweep several beams simultaneously are referred to as multi-beam printers. Both ROS and multi-beam printer techniques are illustrated in U.S. Pat. No. 4,474,422 to Kitamura, the subject matter of which is incorporated herein by reference.

High speed process color or multi-highlight color xerographic image output terminals require multiple independently addressable raster lines to be printed simultaneously at separate exposure stations. This is called multi-station printing. Conventional architectures from multi-station process color printers use a plurality of separate ROSs, usually four independent ROSs, one for each system color, for example, as illustrated in U.S. Pat. Nos. 4,847,642 and 4,903,067 to Murayama et al., the disclosures of which are incorporated herein by reference.

One problem with these systems are the high cost related to the multiple ROSs, the high cost of producing nearly identical multiple ROSs and associated optics, and the difficulty of registering the system colors.

U.S. Pat. No. 5,243,359 to Tibor Fisli, the disclosure of which is incorporated herein by reference, discloses a ROS system suitable for deflecting multiple laser beams in a multi-station printer. In U.S. Pat. No. 5,243,359, a rotating polygon mirror simultaneously deflects a plurality of clustered, dissimilar wavelength laser beams, having their largest divergent angles parallel to one another. The laser beams are subsequently separated by a plurality of optical filters and are directed to their associated photoreceptors. Similarly dimensioned spots are obtained on each photoreceptor by establishing similar optical path lengths for each beam. The laser diodes in U.S. Pat. No. 5,243,359 are arranged in the slow scan direction (i.e., sagittally offset). Diodes arranged in the slow scan direction must be arranged such that they are packed closely in a direction parallel to the polygon mirror's rotational axis to minimize beam characteristic deviations such as spot size, energy uniformity, bow and linearity. Thus, the laser diodes are kept as closely as possible in the direction parallel to the polygon mirror's rotational axis so that the light beams strike nearly the same portion of the polygon mirror as possible.

U.S. Pat. No. 5,341,158 to James Appel et al., the disclosure of which is incorporated herein by reference, discloses a ROS system in which the laser beams are arranged in the fast scan direction (i.e., tangentially offset). Wavelength discriminating optics are used to alternately separate and reflect the light beams from a polygon mirror.

Additionally, U.S. application Ser. No. 07/948,530 to James Appel et al., filed Sep. 22, 1992, the disclosure of which is incorporated herein by reference, discloses one system that separates laser beams based on both the wavelength and the polarization of each of the beams.

The ROS systems described in U.S. Pat. No. 5,243,359 and 5,341,158 are generally described with respect to single spot scanning whereby only a single light beam is directed onto each respective photoreceptor. However, it is understood that these systems can be modified to incorporate multispot printing whereby more than one light beam is directed onto each respective photoreceptor.

Polygon scanners such as that described above are well known in the art and are described, for example, in "Laser Scanning For Electronic Printing," *Proceedings of the IEEE*, Vol. 70, No. 6, June 1982 by John C. Urbach et al., the disclosure of which is incorporated by reference. Other optical polygon scanner embodiments are: similarly known and are within the scope of this invention.

In both single spot and multispot imaging using a plurality of photoreceptors, it is necessary to strictly control the exact placement of the light beam on each of the photoreceptors. This process is called registration. Registration is a very serious problem that requires strict control of the light beams being directed onto the photoreceptors. As is well known, the precise registration of the toner layers (such as yellow, cyan, magenta and black) is essential to produce high quality color images. The misregistration of one of the four light beams can cause serious consequences that are visually noticeable to the user.

SUMMARY OF THE INVENTION

This invention provides an optical system that allows proper registration of light beams in a raster scanning optical system. This invention also provides a method and apparatus for displacing a scan line location on a photoreceptor by a desired amount in a direction parallel to the slow scan direction. As will be described below, this invention applies to imaging on photoreceptors and belts as well as other imaging devices.

Thus, this invention provides a raster scanning optical system having a light receiving member that receives a light beam and advances in a process direction. A scanning device, such as a polygon mirror, scans the light beam across the light receiving member at a scan line location in a direction perpendicular to the process direction. A light transmissive plate is located in a path of the light beam between the scanning device and the light receiving member. The light transmissive plate is controlled to displace the scan line location on the light receiving member by a desired amount in a direction parallel to the process direction.

This invention also provides an adjusting device that contacts the light transmissive plate for controllably adjusting the position of the light transmissive plate so as to displace the scan line location on the light receiving member by the desired amount.

This invention additionally provides a method for adjusting a location of the scan line on a light receiving member. A light beam is scanned from a scanning device onto the light receiving member to form a scan line extending in a fast scan direction. The light beam passes through a light transmissive plate located in a path of the light beam between the scanning device and the light receiving member. A position of the light transmissive plate is then adjusted. A new light beam is scanned through the adjusted light transmissive plate and across the light receiving member in the fast scan direction. Based on the adjusted light transmissive plate, a scan line location is displaced by a desired amount in a direction perpendicular to the fast scan direction. Accordingly, the new scan line location is parallel to the initial scan line location.

Other objects, advantages and salient features of the invention will become apparent from the following detailed description taken in conjunction with the annexed drawings, which disclose preferred embodiments of the invention.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

Figure 1:
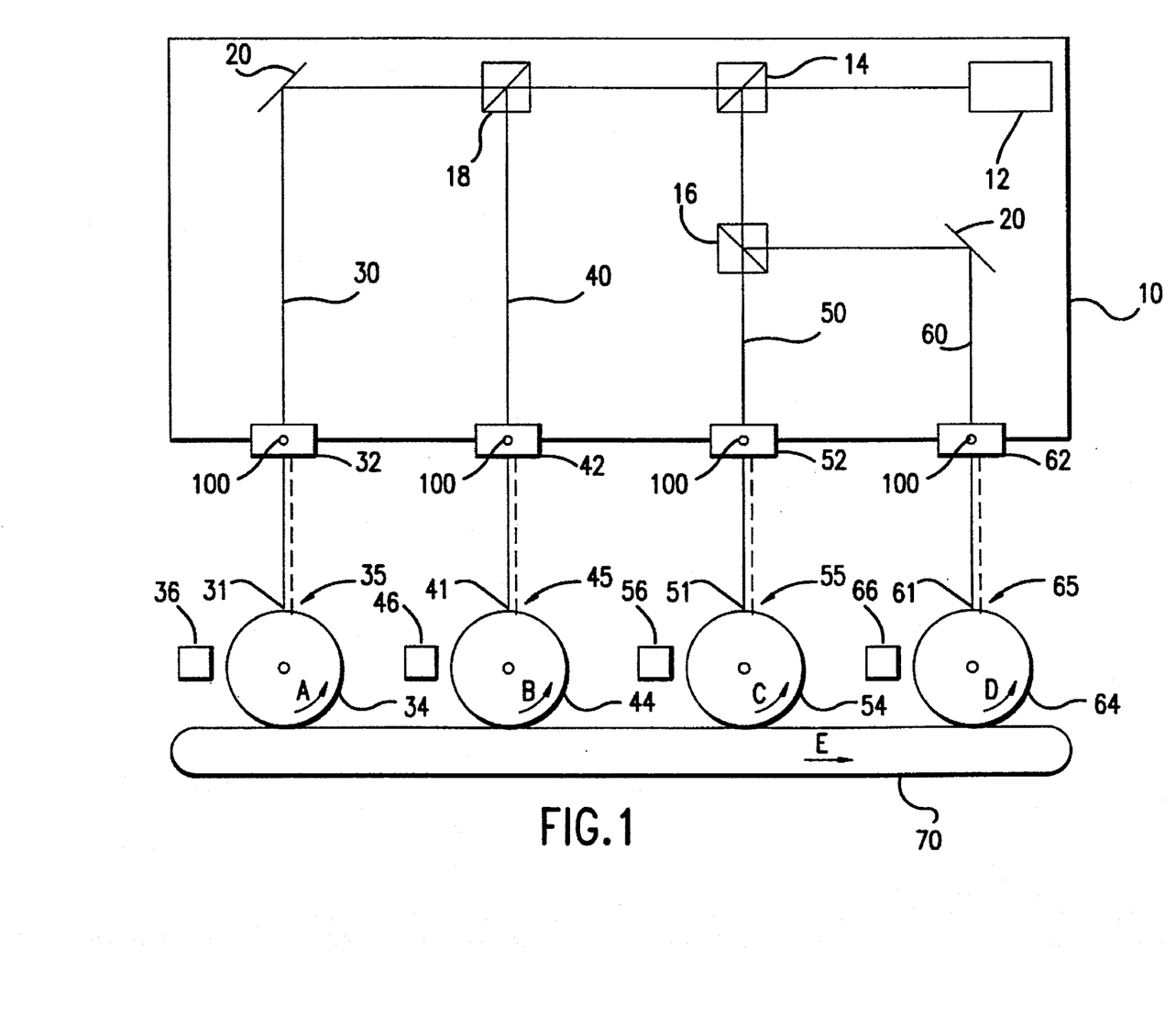
FIG. 1 shows a schematic view of a multistation raster output scanner incorporating embodiments of the present invention.

FIG. 1 illustrates one embodiment of a raster output scanner used in the present invention. As shown, a polygon mirror 12 is rotated about a central axis to scan four light beams (or laser beams) as is well known in the art. The light beams are separated using optical filters 14, 16 and 18 to form the light beams 30, 40, 50 and 60 on different optical paths. Those skilled in the art will realize that the optical filters 14, 16 and 18 typically separate the light beams based on the either wavelength or polarization as described in U.S. Pat. No. 5,243,359 to Fisli, U.S. Pat. No. 5,341,158 to Appel et al. and U.S. application Ser. No. 07/948,530, filed Sep. 22, 1992.

As can be seen from FIG. 1, the polygon mirror 12, the optical filters 14, 16 and 18 and the respective mirrors 20 are housed within a casing 10 as is well known in the art. Using the optical filters 14, 16 and 18, the four light beams 30, 40, 50 and 60 are respectively sweeped across the photoreceptors 34, 44, 54 and 64. As is well known in the art, the light beam 30 scans across the photoreceptor 34 in a fast scan direction while the photoreceptor 34 is advancing in a slow scan direction A. The light beam 30 is directed onto the photoreceptor 34 at a scan line location 31 to form a latent image. The latent image is then developed at a developing station 36 to form a developed image as is well known in the art. The developed image is then generally transferred to an intermediate belt 70 rotating in a direction E. The developed image may similarly be transferred directly onto a copy sheet.

Similarly, the light beam 40 is scanned across photoreceptor 44 in a fast scan direction while the photoreceptor 44 is advancing in a slow scan direction B. As can be seen in FIG. 1, the light beam 40 is scanned across the photoreceptor 44 at a scan line location 41 to form a latent image. The latent image is later developed at a developing station 46 and is transferred to the intermediate belt 70. The light beam 50 is likewise scanned across the photoreceptor 54 in a fast scan direction as the photoreceptor 54 is advancing in a slow direction C. The light beam 50 scans across the photoreceptor 54 at a scan line location 51. The latent image is then developed at a developing station 56 and is transferred to the intermediate belt 70. Finally, the light beam 60 is scanned across the photoreceptor 64 in a fast scan direction as the photoreceptor 64 is advancing in a slow scan direction D. As can be seen, the light beam 60 is scanned along a scan location 61 of the photoreceptor 64. A developing station 66 develops the latent image into a developed image. The developed image is then transferred to the; intermediate belt 70.

Figure 9A:
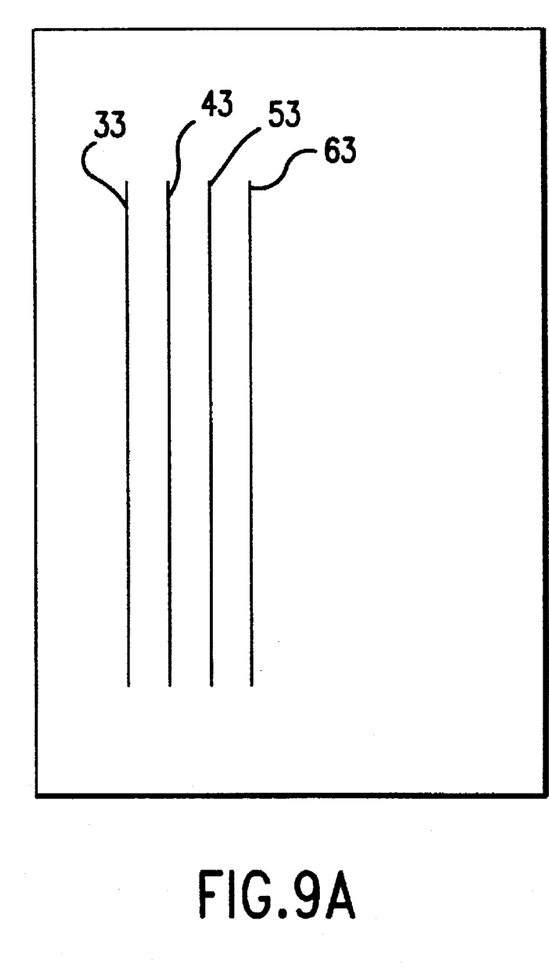
FIG. 9a shows a photoreceptor receiving four scan lines in misregistration.
Figure 9B:
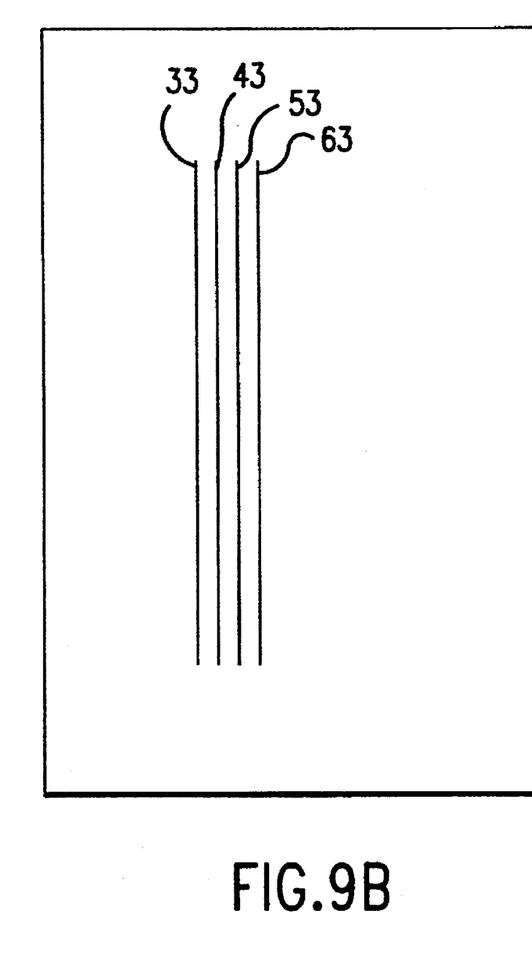
FIG. 9b shows four scan lines being properly registered by embodiments of the present invention.

As is well known in the art, when each photoreceptor 34, 44, 54 and 64 transfers a toned image onto the belt 70, the registration of each of the images being transferred must be properly registered. This is because the images are transferred on top of each other or in very close proximity to each other as is well known to those skilled in the art. However, when the images are improperly registered (i.e., improperly aligned with respect to each other), then an image such as that shown in FIG. 9A may result. The scan line 33 is transferred to belt 70 from the photoreceptor 34, the scan line 43 is transferred from the photoreceptor 44, the scan line 53 is transferred from the photoreceptor 54 and the scan line 63 is transferred from the photoreceptor 64. FIG. 9A is merely illustrative to show four scan lines in misregistration with each other. It is desired that these scan lines are imaged directly on top of each other or in close proximity to each other as shown in FIG. 9B. The visual difference is readily apparent between FIGS. 9A and 9B when the multitoned image or multilayered image is eventually produced on a copy sheet.

The present invention uses a light transmissive plate 32 located in a path of the light beam 30 between the polygon mirror 12 and the photoreceptor 34 as can be seen in FIG. 1. Similarly, a light transmissive plate 42 is located in a path of the light beam 40 between the polygon mirror 12 and the photoreceptor 44. A light transmissive plate 52 is also located in the path of the light beam 50 between the polygon mirror 12 and the photoreceptor 54. Finally, a light transmissive plate 62 is located in a path of the light beam 60 between the polygon mirror 12 and the photoreceptor 64. Each of the light transmissive plates 32, 42, 52 and 62 are preferably separately adjustable to adjust the respective scan line locations 31, 41, 51 and 61 on each of the photoreceptors 34, 44, 54 and 64 as will be described below.

For example, when the plate 32 is adjusted, the light beam 30 passes through the plate 32 and is directed to a new scan line location 35 on the photoreceptor 34. This can be seen by the dotted line between the plate 32 and the photoreceptor 34. Likewise, by adjusting the plate 42, the light beam 40 can be directed to a new scan line location 45 on the photoreceptor 44. Further, when the plate 52 is adjusted, the light beam 50 can be directed to a new scan line location 55 on the photoreceptor 54. Finally, the light beam 60 can be adjusted by the plate 62 to a new scan location 65 on the photoreceptor 64. Thus, by appropriately adjusting the plates 32, 42, 52 and 62, the toned images being transferred to the belt 70 can be properly registered with each other so as to produce a properly registered image.

The plates 32, 42, 52 and 62 preferably are separately adjusted so as to control displacement of the scan line locations on the photoreceptors 34, 44, 54 and 64. After adjusting the plates 32, 42, 52 and 62, the light beams scan across the respective photoreceptors at the new scan line locations 35, 45, 55 and 65. Accordingly, the placement of the respective scan lines and thus the respective developed images can be controlled to properly register the images being transferred from the photoreceptors 34, 44, 54 and 64 onto the belt 70 to form the multi-layered toned image.

Figure 2:
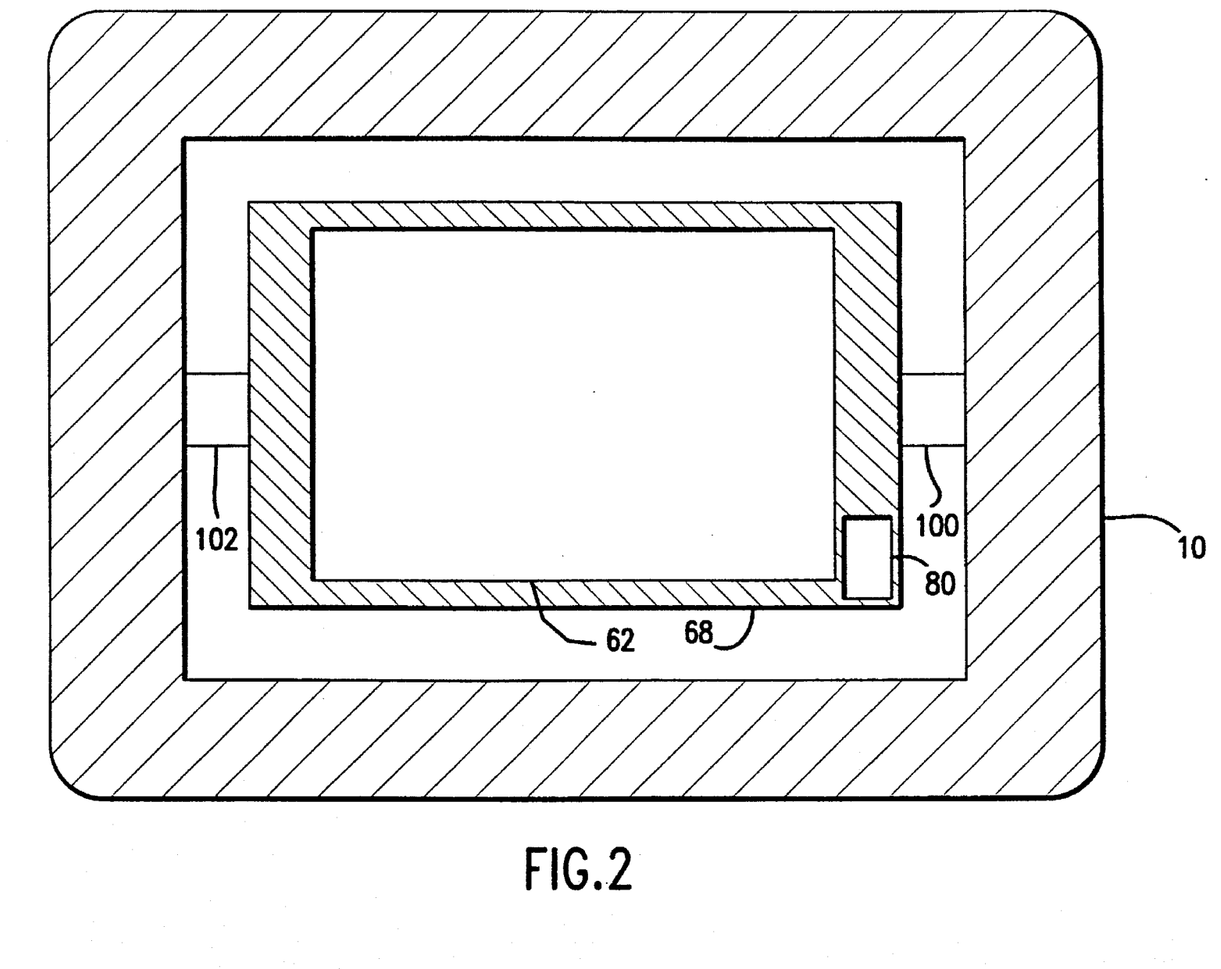
FIG. 2 shows a schematic view of an embodiment of the light transmissive plate of the present invention.

FIG. 2 shows an embodiment used to adjust the plate 62 and thus the light beam 60. However, the embodiment described with respect to FIG. 2 may be incorporated with any of the other light beams 30, 40 and 50 and the plates 32, 42 and 52. As is shown in FIG. 2, the plate 62 is mounted within a holding device 68 so that the holding device 68 surrounds the edges of the plate 62 and allows the light beam 60 to pass through the plate 62 towards the photoreceptor 64. The plate 62 and the holding device 68 are connected to the housing 10 preferably using pivoting rods 100 and 102. The pivoting rods 100 and 102 allow the holding device 68 and thus the light transmissive plate 62 to pivot so as to change the scan line location on the photoreceptor 64. Pivoting rods 100 can also be seen in FIG. 1 to allow the plates to pivot.

As shown in FIG. 2, the holding device 68 may include a contact area 80 that will be described below. The contact area 80 may physically be an area of the holding device 68 or the contact area 80 may include a rubber element contacting the holding device 68. As shown, the contact area 80 is preferably off to one side of the holding device 68 away from the pivoting rods 100 and 102. The contact area 80 is shown to illustrate one embodiment of how the plate 62 may be adjusted. Therefore, the inclusion of the contact area 80 is not meant to be limiting but rather shows an embodiment for moving the holding device 68 with respect to FIGS. 3 and 4.

Figure 3:
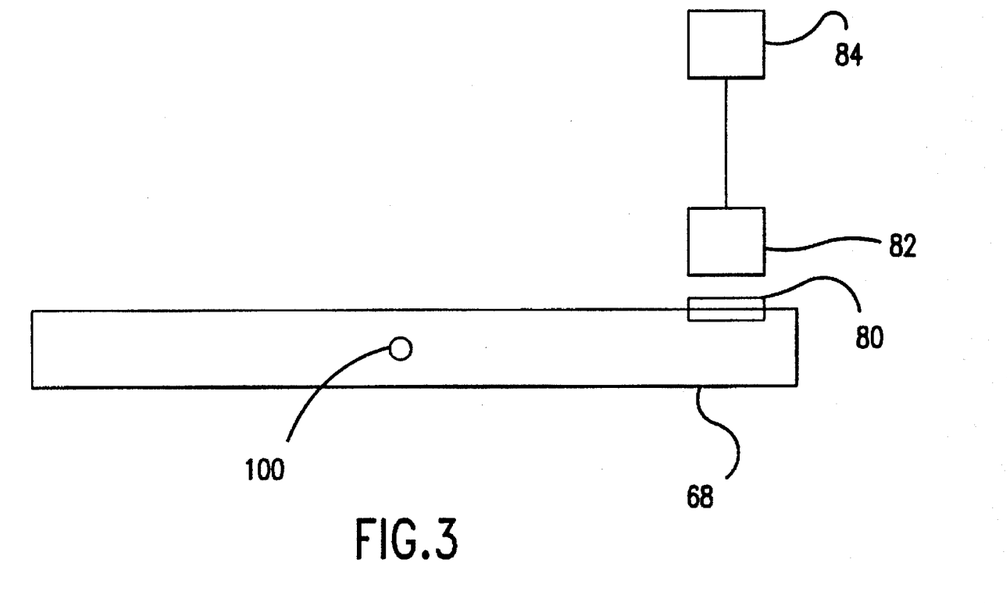
FIG. 3 shows an embodiment of an adjusting device of the present invention.

FIG. 3 shows a side view of the holding device 68. As shown in FIG. 3, an abutment 82 abuts against the contact area 80 of the holding device 68. A stepping motor 84 is connected to the abutment 82 to control the movement of the abutment 82 against the contact area 80. As is apparent from FIG. 3, when the abutment 82 is moved in a direction J (or in an opposite direction), the holding device 68 is pivoted about the pivoting rods 100 and 102 to change an angular orientation of the plate 62. Thus, the user is able to adjust an angular displacement of the plate 62 by controlling an amount of movement of the abutment 82 using the motor 84. The motor 84 may be controlled manually by using a control device (not shown) or controlled automatically using a computer storing the appropriate data relative to movement. Further, the abutment 82 may abut directly against the plate 62 rather than the holding device 68. As is well known in the art, rotation is one of the most controllable motions regarding optical precision. Thus, the rotation of a plate 62 is extremely beneficial for solving registration problems.

Figure 4:
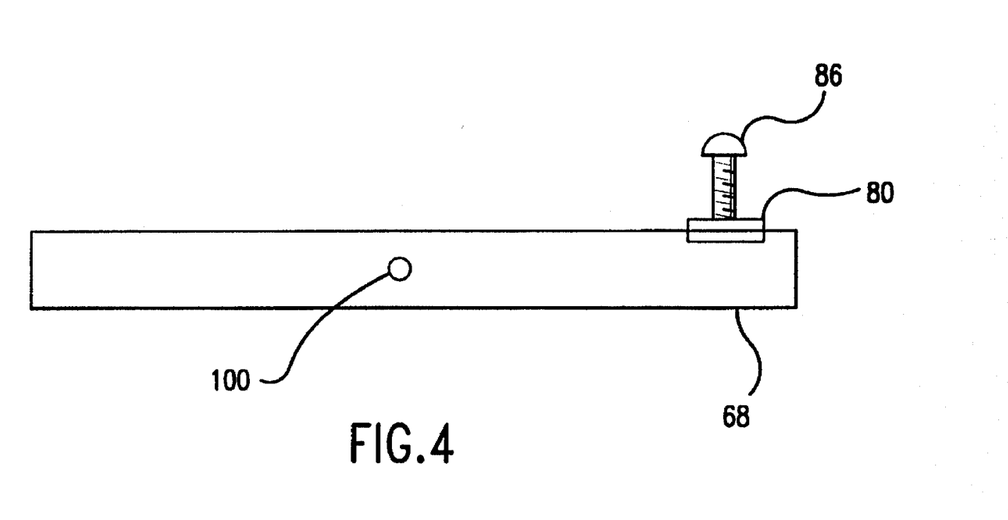
FIG. 4 shows another embodiment of an adjusting device of the present invention.

FIG. 4 shows another embodiment of an adjusting device that similarly uses an abutment 82 against the contact area 80. In this embodiment, a setting screw 86 contacts the abutment 82 so that a user may manually control the pivoting of the holding device 68 about the pivoting rods 100 and 102. The setting screw 86 is preferably exposed to an outside area of the casing 10 to be easily adjusted by a user. Other adjusting devices and holding devices may similar be used and are intended to be within the scope of the present invention.

Figure 5:
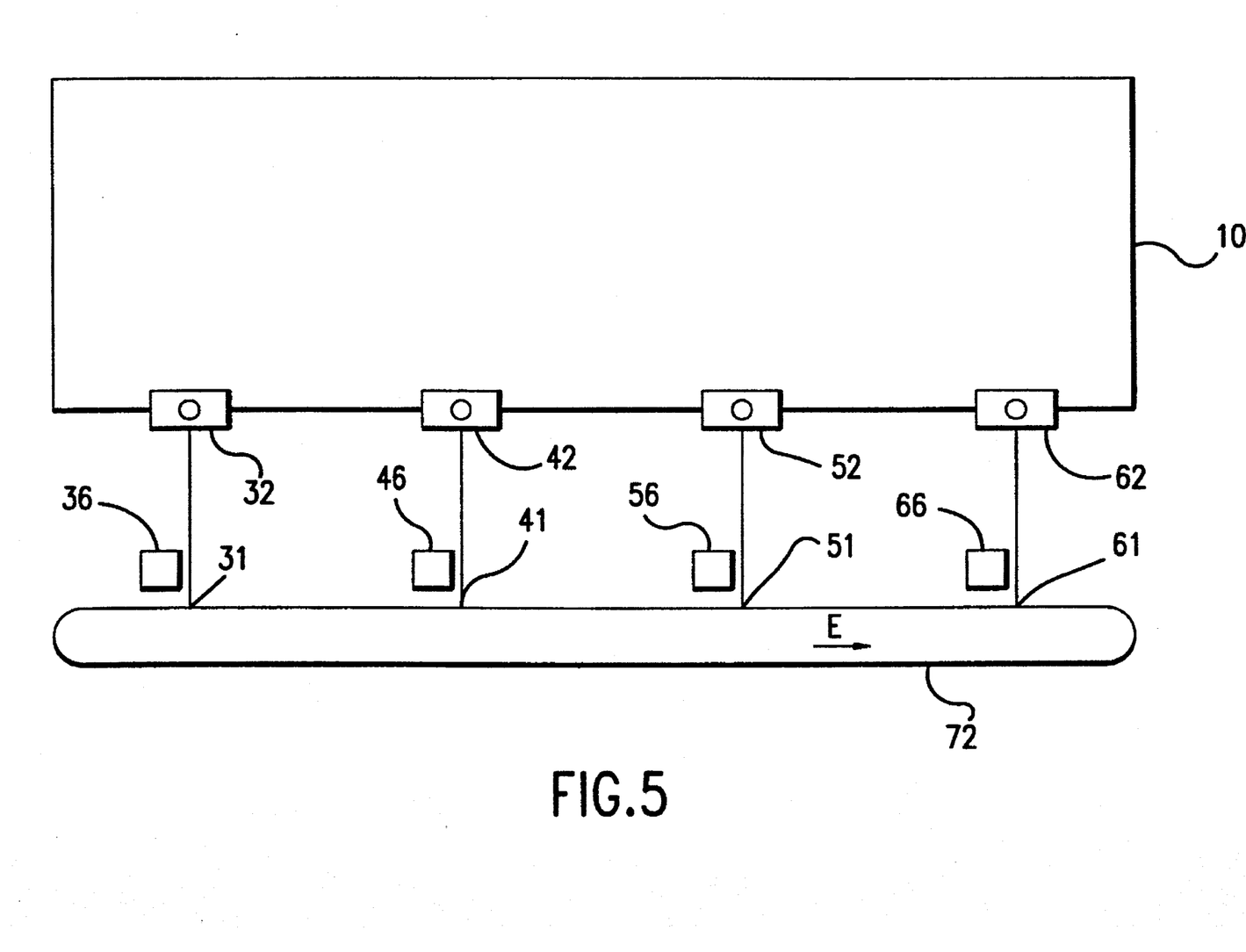
FIG. 5 shows a schematic view of another embodiment of a multistation raster output scanner of the present invention.

FIG. 5 illustrates another embodiment in which each of the light beams 30, 40, 50 and 60 are directly imaged onto the belt 72 to form latent images. Imaging directly on a belt is also well known to those skilled in the art. Developing stations 36, 46, 56 and 66 are positioned along the belt 72 to develop the latent images as the multi-toned image advances along the belt 72. As is shown in FIG. 5, each of the light beams 30, 40, 50 and 60 is scanned across the belt 72 at a respective scan line location 31, 41, 51 and 61. The plates 32, 42, 52 and 62 are mounted within the housing 10 and are capable of being adjusted by the respective adjusting devices to thereby change the scan line locations in similar manner to the other described embodiments.

Figure 6:
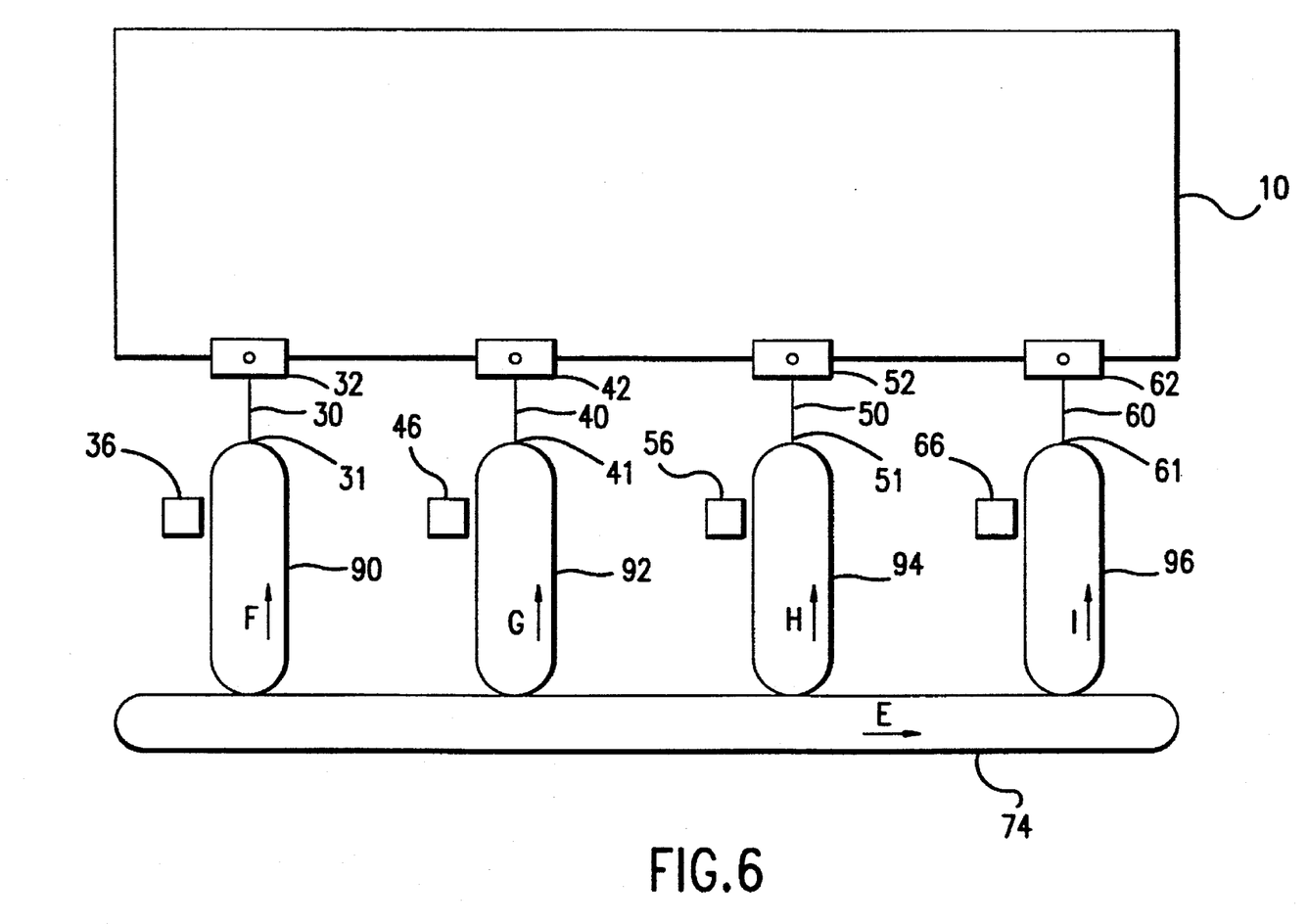
FIG. 6 shows a schematic view of another embodiment of a multistation raster output scanner of the present invention.

FIG. 6 shows another embodiment where the latent images are formed on different belts 90, 92, 94 and 96. For example, the light beam 30 is scanned across the belt 90 in a fast scan direction as the belt 90 is advancing in the slow direction F. The image is then developed at the developing station 36 and is subsequently transferred onto the intermediate belt 74 or copy sheet. Similarly, the light beams 40, 50 and 60 are scanned across the belts 92, 94 and 96, respectively. As described above, each of the light beams 30, 40, 50 and 60 is scanned at a respective scan line location 31, 41, 51 and 61. However, by using the plates 32, 42, 52 and 62, the scan line locations may be controllably adjusted so as to control the registration of the toned image on the belt 74.

Figure 7:
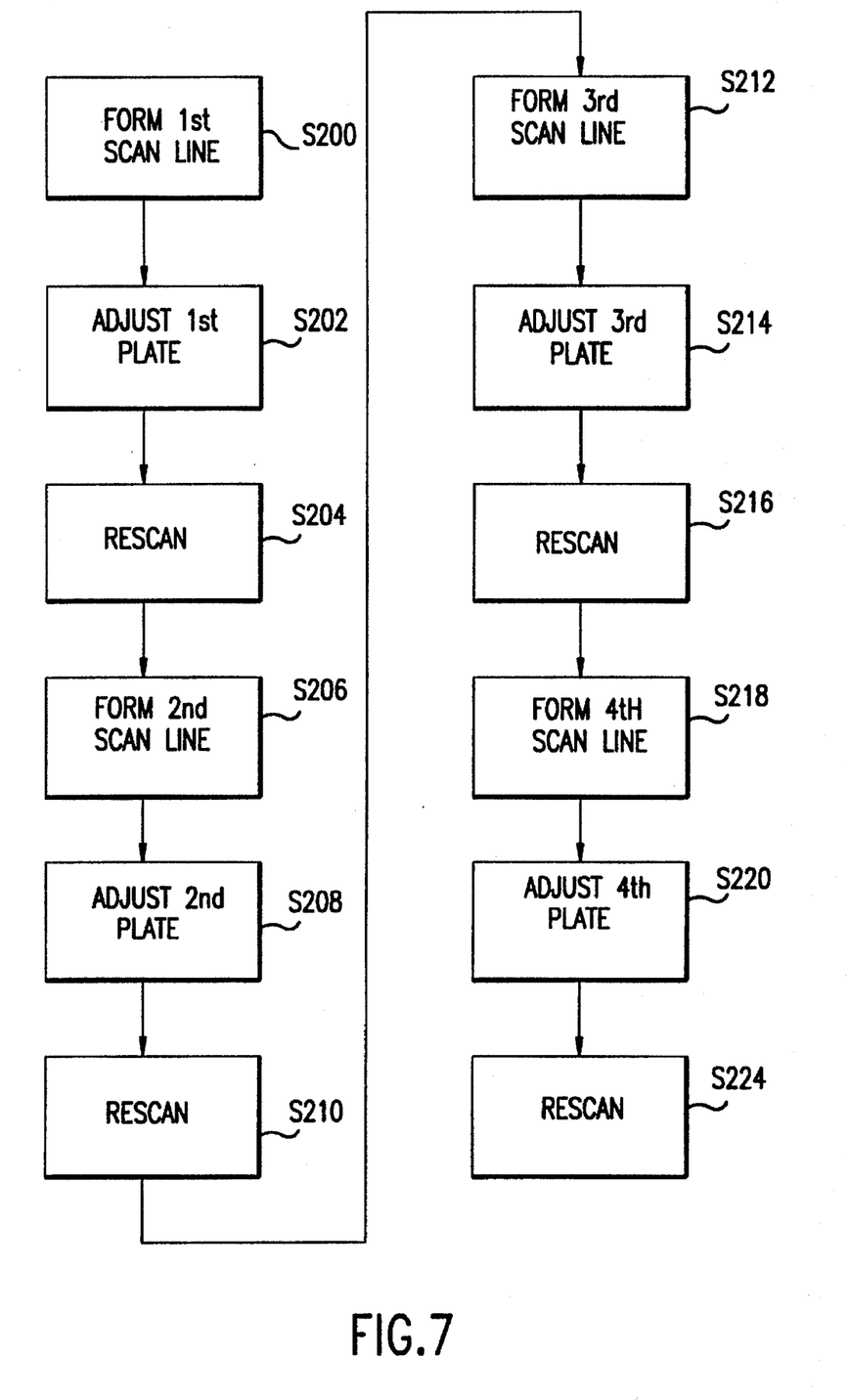
FIG. 7 shows a flowchart of a method of the present invention.

FIG. 7 shows a flow chart for use with the present invention and more specifically with respect to four light beams being separately imaged on different photoreceptors such as the embodiment described with respect to FIG. 1. The description with respect to four light beams and four photoreceptors is merely illustrative and is not limiting. In step 200, a first scan line is formed by scanning the light beam 60 across the photoreceptor 64 at the scan line location 61. In step 202, the plate 62 is then adjusted by a desired amount in order to properly adjust the scan line location to a new scan line location 65 as shown in FIG. 1. The plate 62 may be adjusted by one of the adjusting devices described with respect to FIGS. 3 and 4. The light beam 60 is then scanned across the new scan line location 65 in step 204 by passing the light beam 60 through the adjusted plate 62.

The light beam 50 is scanned across the photoreceptor 54 at the scan line location 51 in step 206. The plate 52 is adjusted in step 208 preferably using one of the described adjusting devices. In step 210, the beam 50 is rescanned through the adjusted position of the plate 52 and across the new scan location 55. The adjustment of the plate 52 is controlled so that the light beam 50 is displaced on the photoreceptor 54 by a desired amount. In step 210, the user may scan the beam 60 and the beam 50 across the respective photoreceptors 64 and 54 and transfer the resulting toned images onto the belt 70. The transferred toned images may the be visually inspected to determine if the two images are properly registered. If the toned image is not properly registered, the user may repeat step 208 by further adjusting the plate 52 so as to properly register the light beam 50 and thus the toned image on the intermediate belt 70.

The operation then continues for light beams 30 and 40 as will be described. In step 212, the third light beam 40 passes through the plate 42 and is scanned across the photoreceptor 44 at the scan line location 41. Then, in step 214, the plate 42 is adjusted to displace the scan line location on the photoreceptor 44. Then in step 216, the light beam 40 is rescanned across the new scan line location 45 by passing the beam 40 through the adjusted position of the plate 42. By similarly passing beams 60 and 50 through their respective adjusted plates 62 and 52, it can be determined whether the three light beams 40, 50 and 60 and thus the respective toned images are appropriately registered. The adjusting step 214 can be repeated until the toned images are properly registered.

Finally, the light beam 30 is scanned across a scan line location 31 on the photoreceptor 34. In step 220, the plate 32 is adjusted as described above. Then, in step 222, the light beam 30 is scanned across the new scan line location 35 by passing the beam 30 through the adjusted plate 32. Finally in step 224, the resulting toned image can then be visually inspected by scanning all four of the beams 30, 40, 50 and 60 and determining if the fourth beam 30 is in proper registration with the other toned images.

By appropriately adjusting each, of the plates 32, 42, 52 and 62, the scan line locations and thus the registration of the photoreceptors can be very precisely controlled. Steps 202, 208, 214 and 220 may be repeated until proper registration occurs. However, once two or more images are visually determined to be properly registered, it is unnecessary to further adjust these images. Rather, only subsequent beams should be adjusted by the plates into registration with the prior registered images.

Figure 8A:
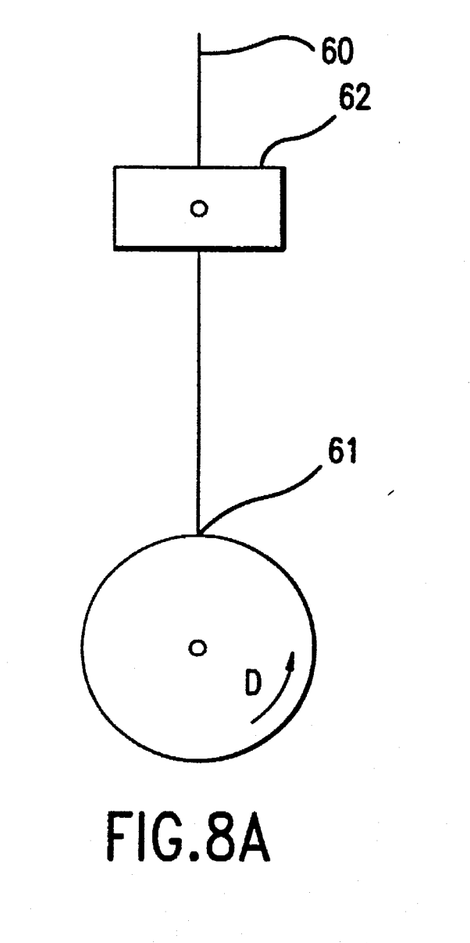
FIG. 8a shows a light beam directed towards a photoreceptor.
Figure 8B:
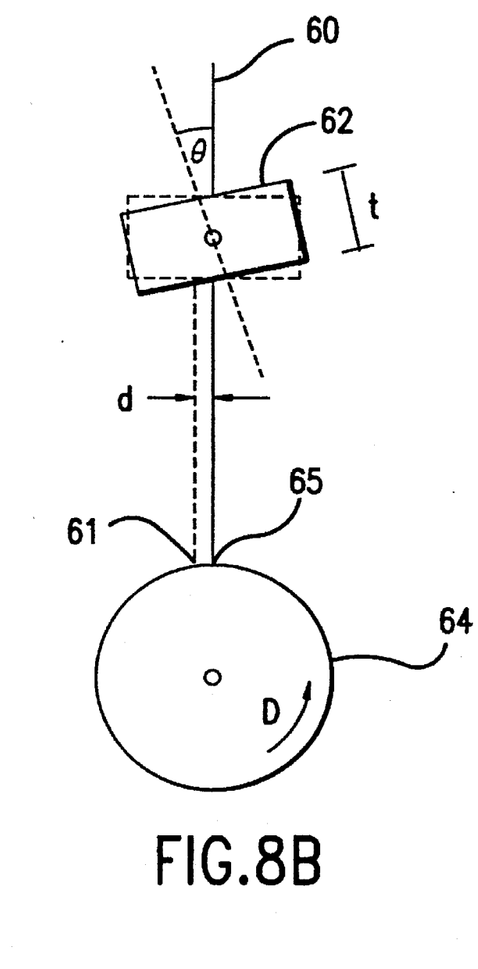
FIG. 8b shows an adjusted light transmissive plate directing a light beam towards a new scan line location on a photoreceptor.

FIGS. 8A and 8B show how the scan line location may be displaced by adjusting a plate 62. As can be seen in FIG. 8A, the light beam 60 initially passes through the plate 62 having an initial angular position and is scanned across the scan line location 61 on the photoreceptor 64. As was described above, the light beam 60 is scanned in a fast scan direction across the photoreceptor 64 moving a slow scan direction D. To displace the scan line location 61, the plate 62 is pivoted about the pivoting rod 100 preferably using one of the adjusting devices described with respect to FIGS. 3 and 4. The pivotal rotation of the plate 62 thereby changes the incident angle (Θ) of the beam 60 into the plate 62. This thereby causes the beam 60 passing through the plate 62 to be parallelly displaced by an amount d. The displaced light beam causes the light beam 60 to be directed onto a new scan line location 65 because the center of rotation of the photoreceptor 64 has not moved with respect to the casing 10. In similar manner to that described in FIG. 8a, the beam 60 is scanned in a fast scan direction at the scan line location 65 while the photoreceptor 64 is advancing in the slow scan direction D. Therefore, the scan line location is displaced in the process direction such that the new scan line location 65 is parallel to the initial scan line location 61.

For example, FIG. 9A shows four scan lines 33, 43, 53 and 63 in misregistration with one another. By appropriately adjusting the plates 32, 42, 52 and 62, the scan lines can be displaced to new scan line locations to thus form scan lines 37, 47, 57 and 67 as shown in FIG. 9B. As is understood, proper registration in FIG. 9B would require the scan lines to be virtually on top of each other (in case of processed black) or in close proximity. Thus, FIG. 9B is merely an exaggerated example of the desired result.

The light transmissive plate 62 is preferably made of parallel glass. Other similar substances may be used. For proper system function, the clear aperture area of the plate 62 must be parallel within a few minutes of arc, be optically flat within about one-fifth of the operating wavelength, be free of digs, scratches, bubbles and should have a minimum of 98% transmission (with antireflection coating on both sides) at the operating wavelength. The amount of parallel displacement of the light beam using such a parallel glass plate for small angles can be described by the following formula:

$$d = t \sin \theta (N'-1)/N' \qquad \text{Equation 1}$$

where:

d=parallel displacement;

t=plate thickness;

θ=angle of incidence; and

N"=index refraction of glass.

For example, as shown in FIG. 8B, if the glass plate 62 has a thickness of 2 mm and an index of 1.5, a 5° tile will produce 58 μm displacement. Such a glass plate incorporated into a raster scanning system should have a wide range of use. Thus, when registering the different light beams and thus the images, the adjusting steps can be performed by appropriately calculating the parallel displacement of the light beams or by repeatedly adjusting the respective plates until proper registration occurs.

Figure 10:
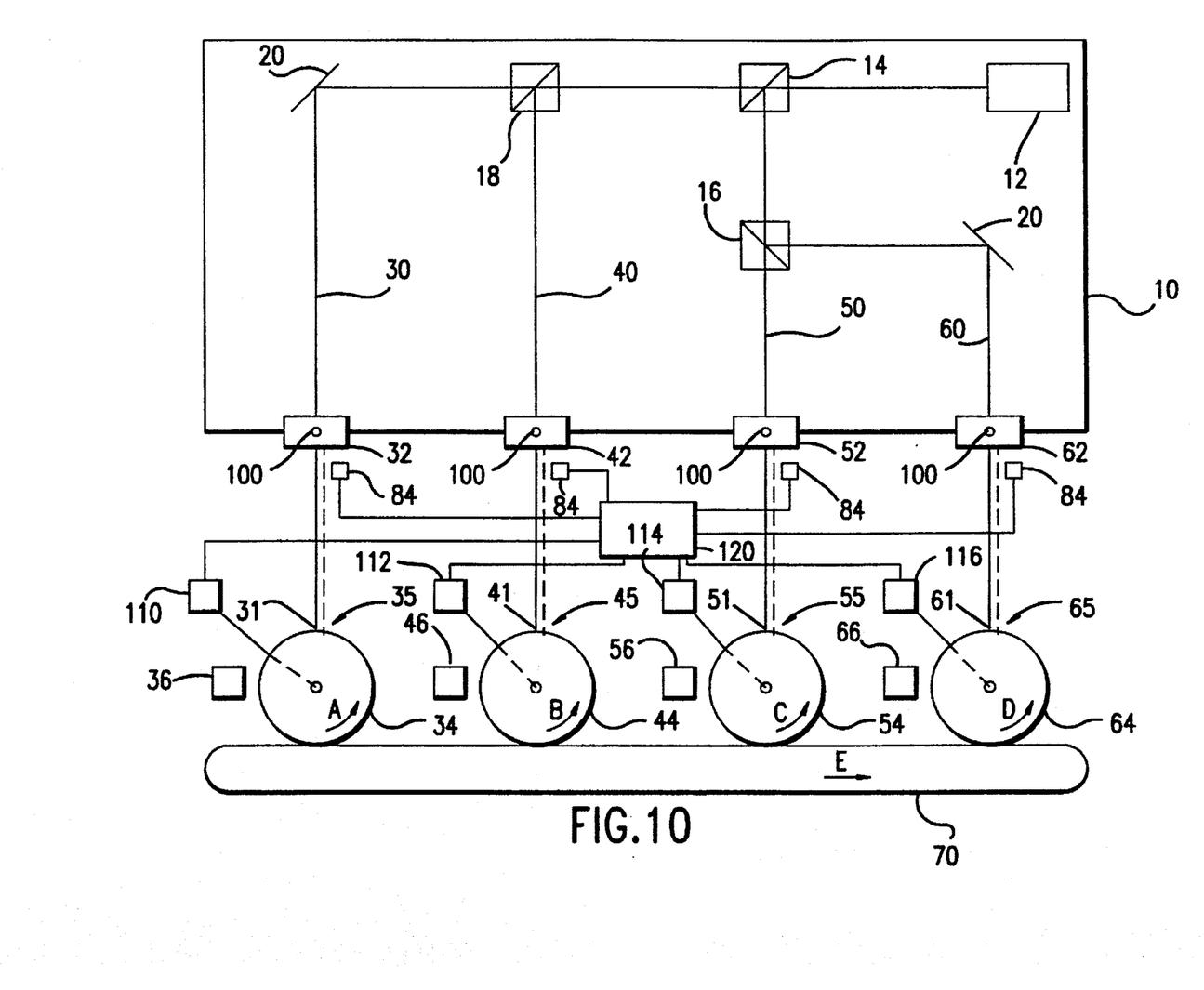
FIG. 10 shows a schematic view of a multistation raster output scanner incorporating another embodiment of the present invention.

FIG. 10 shows another embodiment of the present invention used to correct problems caused by the velocity differences among the photoreceptors 34, 44, 54 and 64. As is well known in the art, the velocity difference among different photoreceptors can cause disturbing dynamic misregistration. In the FIG. 10 embodiment, the non-uniform velocity can be measured using, for example, a plurality of shaft encoders 110, 112, 114 and 116. The shaft encoders 110, 112, 114 and 116 generate the appropriate velocity signals and transmit the signals to a controller 120. Based on the velocity signals received, the controller 120 generates signals which are respectively sent to each of the respective motors 84 to individually adjust the respective plates 32, 42, 52 and 62 to the desired position. That is, the controller 120 individually adjusts each of the plates 32, 42, 52 and 62 to correct for problems caused by velocity differences among the photoreceptors. This type of misregistration is mostly due to drum runout and therefore is cyclic. Other methods such as surface velocity may similarly be used with the controller 120 to adjust the respective plates 32, 42, 52 and 62.

While the invention has been described with reference to specific embodiments, the description of the specific embodiments is illustrative only and is not to be considered as limiting the scope of the invention. Various other modifications and changes may occur to those skilled in the art without departing from the spirit and scope of the invention.

What is claimed is:

1. A raster scanning optical system comprising:

a light receiving member that receives a light beam, the light receiving member advancing in a process direction;

a scanning device that scans the light beam across the light receiving member at a scan line location in a direction perpendicular to the process direction;

a light transmissive plate located in a path of the light beam between the scanning device and the light receiving member; and an adjusting device, contacting the light transmissive plate, for controllably adjusting a position of the light transmissive plate to displace the scan line location on the light receiving member, the light transmissive plate being adjustably controlled by the adjusting device to displace the scan line location on the light receiving member by a desired amount in a direction parallel to the process direction.

2. The raster scanning optical system of claim 1, wherein the adjusting device comprises:

an abutment contacting the light transmissive plate; and a motor attached to the abutment for mechanically moving the abutment to adjust the position of the light transmissive plate to a desired position.

3. The raster scanning optical system of claim 2, further comprising a controlling device automatically controlling the motor to adjust the position of the light transmissive plate.

4. The raster scanning optical system of claim 3, wherein the controlling device comprises a shaft encoder determining a velocity of the light receiving member and a controller automatically determining the position of the light transmissive plate from the velocity of the light receiving member.

5. The raster scanning optical system of claim 1, wherein the adjusting device comprises a setting screw contacting the light transmissive plate.

6. The raster scanning optical system of claim 1, wherein the adjusting device supports the light transmissive plate at an initial position and controllably adjusts a position of the light transmissive plate to displace the scan line location on the light receiving member.

7. The raster scanning optical system of claim 1, wherein the light receiving member comprises a belt advancing in the process direction.

8. The raster scanning optical system of claim 1, wherein the light receiving member comprises a photoreceptor advancing in the process direction.

9. A raster scanning optical system comprising:

a light receiving member for receiving a light beam, the light receiving member advancing in a process direction;

a scanning device for scanning the light beam across the light receiving member to form a scan line along a direction perpendicular to the process direction;

a light transmissive device located in a path of the light beam between the scanning device and the light receiving member; and an adjusting device contacting the light transmissive plate, the adjusting device adjusting an angular position of the light transmissive plate to displace the location of the scan line on the light receiving member by a desired amount in a direction parallel to the process direction.

10. The raster scanning optical system of claim 9, wherein the light receiving member comprises a photoreceptor.

11. The raster scanning optical system of claim 9, further comprising a controlling device for controlling a position of the light transmissive plate based on a velocity of the photoreceptor.

12. The raster scanning optical system of claim 9, wherein the light receiving member comprises a belt.

13. The raster scanning optical system of claim 9, wherein the scanning device comprises a rotating polygon mirror.

14. The raster scanning optical system of claim 9, further comprising a controlling device for automatically controlling the adjusting device so as to controllably adjust the angular position of the light transmissive plate.

15. The raster scanning optical system of claim 9, wherein the adjusting device comprises:

a holding device supporting the light transmissive plate;

an abutment contacting the holding device; and a motor attached to the abutment for moving the abutment to adjust the angular position of the light transmissive plate.

16. The raster scanning optical system of claim 9, further comprising a holding device supporting the light transmissive plate, the adjusting device comprising a setting screw contacting the holding device, the setting screw being adjustably controlled to adjust the angular position of the light transmissive plate.

17. The raster scanning optical system of claim 9, wherein the adjusting device is mounted to the light transmissive plate, the adjusting device controlling the desired amount of displacement on the light receiving member.

18. The raster scanning optical system of claim 9, wherein the adjusting device contacts the light transmissive plate, the adjusting device adjusting a position of the light transmissive plate, the adjusted position of the light transmissive plate displacing the location of the scan line on the light receiving member by the desired amount.

19. The raster scanning optical system of claim 9, further comprising a holding member attached to and supporting the light transmissive plate at an initial position, wherein the adjusting device contacts the holding member and adjusts a position of the light transmissive plate, the adjusted position of the light transmissive plate displacing the location of the scan line on the light receiving member by the desired amount.

20. The raster scanning optical system of claim 9, wherein the light transmissive plate comprises a planar glass plate.

21. A printer comprising:

an image receiving device for receiving a plurality of light beams, the image receiving device advancing in a process direction;

a scanning device that scans the plurality of light beams across the image receiving device in a direction perpendicular to the process direction to form a plurality of scan lines;

a plurality of light transmissive plates, each light transmissive plate located in a path of one of the plurality of light beams between the scanning device and the image receiving device, the plurality of light transmissive plates controllably displacing a location of each scan line on the image receiving device by a desired amount in a direction parallel to the process direction; and an adjusting device to controllably adjust the plurality of light transmissive plates.

22. The printer of claim 21, wherein the image receiving device comprises a belt receiving the plurality of light beams.

23. A printer comprising:

an image receiving device for receiving a plurality of light beams;

a scanning device that scans the plurality of light beams across the image receiving device to form a plurality of scan lines extending in a first direction;

a plurality of light transmissive plates, each light transmissive plate located in a path of one of the plurality of light beams between the scanning device and the image receiving device; and a plurality of adjusting devices each being connected to one of the light transmissive plates, the plurality of adjusting devices adjusting an angular position of each light transmissive plate to displace a location of each of the scan lines on the image receiving device by a desired amount in a direction perpendicular to the first direction.

24. The printer of claim 23, wherein the image receiving device comprises a belt receiving the plurality of light beams.

25. The printer of claim 23, wherein the image receiving device comprises a plurality of photoreceptors, each photoreceptor receiving at least one of the plurality of light beams.

26. The printer of claim 25, further comprising a controlling device that determines characteristics of each of the photoreceptors and adjusts each of the light transmissive plates based on the determined characteristics.

27. The printer of claim 26, wherein the characteristics comprise a velocity of each of the photoreceptors.

28. The printer of claim 26, wherein the controlling device corrects for non-uniform velocities of the photoreceptors.

29. The printer of claim 23, wherein the image receiving device comprises a photoreceptor receiving the plurality of light beams, the photoreceptor advancing in a direction perpendicular to the first direction.

30. The printer of claim 23, wherein the image receiving device comprises a plurality of belts, each belt receiving one of the plurality of light beams.

31. A raster scanning optical system comprising:
a light receiving member for receiving a light beam;
a scanning device for scanning the light beam across the light receiving member to form a scan line extending along a fast scan direction; and
a light transmissive plate located in a path of the light beam between the scanning device and the light receiving member, the light transmissive plate controllably displacing a location of the scan line on the light receiving member by a desired amount in a direction parallel to a slow scan direction using an adjusting device, the slow scan direction being perpendicular to the fast scan direction.

32. The raster scanning optical system of claim 31, wherein the light receiving member comprises a belt receiving the light beam, the belt advancing in the slow scan direction.

33. The raster scanning optical system of claim 31, wherein the light receiving member comprises a photoreceptor receiving the light beam, the photoreceptor advancing in the slow scan direction.

34. A multi-station printer comprising:
a first photoreceptor that receives a first light beam, the first photoreceptor rotating in a first direction;
a second photoreceptor that receives a second light beam, the second photoreceptor rotating in a second direction;
a third photoreceptor that receives a third light beam, the third photoreceptor rotating in a third direction;
a fourth photoreceptor that receives a fourth light beam, the fourth photoreceptor rotating in a fourth direction;
a scanning device for scanning the first light beam across the first photoreceptor to form a first scan line in a direction perpendicular to the first direction, for scanning the second light beam across the second photoreceptor to form a second scan line in a direction perpendicular to the second direction, for scanning the third light beam across the third photoreceptor to form a third scan line in a direction perpendicular to the third direction, and for scanning the fourth light beam across the fourth photoreceptor to form a fourth scan line in a direction perpendicular to the fourth direction;
a first light transmissive plate located in a path of the first light beam between the scanning device and the first photoreceptor, the first light transmissive plate displacing a location of the first scan line on the first photoreceptor by a first desired amount in a direction parallel to the first direction;
a second light transmissive plate located in a path of the second light beam between the scanning device and the second photoreceptor, the second light transmissive plate displacing a location of the second scan line on the second photoreceptor by a second desired amount in a direction parallel to the second direction;
a third light transmissive plate located in a path of the third light beam between the scanning device and the third photoreceptor, the third light transmissive plate displacing a location of the third scan line on the third photoreceptor by a third desired amount in a direction parallel to the third direction;
a fourth light transmissive plate located in a path of the fourth light beam between the scanning device and the fourth photoreceptor, the fourth light transmissive plate displacing a location of the fourth scan line on the fourth photoreceptor by a fourth desired amount in a direction parallel to the fourth direction; and
an adjusting device to adjust at least the first light transmissive plate so as to displace the location of the first scan line by the first desired amount.

35. A multi-station printer comprising:
a first light receiving member advancing in a first process direction;
a second light receiving member advancing in a second process direction;
a scanning device for scanning a first light beam across the first light receiving member in a direction perpendicular to the first process direction, for scanning a second light beam across the second light receiving member in a direction perpendicular to the second process direction;
a first adjustable light transmissive plate located in a path of the first light beam between the scanning device and the first light receiving member, the first adjustable light transmissive plate displacing a location of a scan line corresponding to the first light beam on the first light receiving member by a desired amount in a direction parallel to the first process direction;
a second adjustable light transmissive plate, located in a path of the second light beam between the scanning device and the second light receiving member, the second adjustable light transmissive plate displacing a location of a scan line corresponding to the second light beam on the second light receiving member by a desired amount in a direction parallel to the second process direction; and
a first adjusting device to adjust at least the first adjustable light transmissive plate so as to displace the location of the scan line by the desired amount.

36. The multi-station printer of claim 35, further comprising:
a third light receiving member advancing in a third process direction, the scanning device scanning a third light beam across the third light receiving member in a direction perpendicular to the third process direction; and
a third adjustable light transmissive plate located in a path of the third light beam between the scanning device and the third light receiving member, the third adjustable light transmissive plate displacing a location of a scan line corresponding to the third light beam on the third light receiving member by a desired amount in a direction parallel to the third process direction.

37. The multi-station printer of claim 36 further comprising:
a fourth light receiving member advancing in a fourth process direction, the scanning device scanning a fourth light beam across the fourth light receiving member in a direction perpendicular to the fourth process direction; and
a fourth adjustable light transmissive plate located in a path of the fourth light beam between the scanning device and the fourth light receiving member, the fourth adjustable light transmissive plate displacing a location of a scan line corresponding to the fourth light beam on the fourth light receiving member by a desired amount in a direction parallel to the fourth process direction.

38. The multi-station printer of claim 37, wherein the first adjusting device that adjusts an orientation of the first adjustable light transmissive plate, the adjusted orientation of the first adjustable light transmissive plate displacing the location of the scan line corresponding to the first light beam on the first light receiving member by the desired amount in the direction perpendicular to the first process direction.

39. The multi-station printer of claim 38, further comprising a second adjusting device that adjusts an orientation of the second adjustable light transmissive plate, the adjusted orientation of the second adjustable light transmissive plate displacing the location of the scan line corresponding to the second light beam on the second light receiving member by the desired amount in the direction perpendicular to the second process direction.

40. The multi-station printer of claim 39, further comprising a third adjusting device that adjusts an orientation of the third adjustable light transmissive plate, the adjusted orientation of the third adjustable light transmissive plate displacing the location of the scan line corresponding to the third light beam on the third light receiving member by the desired amount in the direction perpendicular to the third process direction.

41. The multi-station printer of claim 40, further comprising a fourth adjusting device that adjusts an orientation of the fourth adjustable light transmissive plate, the adjusted orientation of the fourth adjustable light transmissive plate displacing the location of the scan line corresponding to the fourth light beam on the fourth light receiving member by the desired amount in the direction perpendicular to the fourth process direction.

42. A raster scanning method for adjusting a location of a scan line on a light receiving member, the method comprising the steps of:
scanning a light beam from a scanning device across the light receiving member to form a scan line extending in a fast scan direction, the light beam passing through a light transmissive plate located in a path of the light beam between the scanning device and the light receiving member;
controllably adjusting a position of the light transmissive plate using an adjusting device after scanning the light beam across the light receiving member; and
scanning a new light beam across the light receiving member in the fast scan direction, the new light beam passing through the adjusted light transmissive plate, the adjusted light transmissive plate displacing a location of the scan line on the light receiving member by a desired amount in a direction perpendicular to the fast scan direction.

43. The method of claim 42, wherein the adjusting step comprises adjusting an angular position of the light transmissive plate.

44. The method of claim 42, wherein the step of controllably adjusting a position requires the adjusting device to comprise of a holding device supporting the light transmissive plate and a setting screw contacting the holding device, and positioning the light transmissive plate being adjusted by turning the setting screw.

45. The method of claim 42, wherein the step of controllably adjusting a position requires the adjusting device to comprise of a holding device supporting the light transmissive plate, an abutment contacting the holding device and a motor attached to the abutment to controllably move the abutment.

46. A method for registering scan lines in a raster scanning optical system, the raster scanning optical system comprising a scanning device and a plurality of light receiving members, the method comprising the steps of:
scanning a first light beam across a first light receiving member to form a first scan line extending in a first direction;
scanning a second light beam across a second light receiving member to form a second scan line extending in a second direction, the second light beam passing through a first light transmissive plate located in a path of the second light beam between the scanning device and the second light receiving member;
controllably adjusting a position of the first light transmissive plate using an adjusting device after scanning the second light beam across the second light receiving member; and
rescanning the second light beam across the second light receiving member to form the second scan line, the rescanned second light beam passing through the adjusted first light transmissive plate to displace a location of the second scan line by a desired amount in a direction perpendicular to the second direction, the displaced location of the second scan line being in proper registration with the first scan line.

47. The method of claim 46, further comprising the steps of:
scanning a third light beam across a third light receiving member to form a third scan line extending in a third direction, the third light beam passing through a second light transmissive plate located in a path of the third light beam between the scanning device and the third light receiving member;
controllably adjusting a position of the second light transmissive plate using the adjusting device after scanning the third light beam across the third light receiving member; and
rescanning the third light beam across the third light receiving member to form the third scan line, the rescanned third light beam passing through the adjusted second light transmissive plate to displace a location of the third scan line by a desired amount in a direction perpendicular to the third direction.

48. The method of claim 47, further comprising the steps of:
scanning a fourth light beam across a fourth light receiving member to form a fourth scan line extending in a fourth direction, the fourth light beam passing through a third light transmissive plate located in a path of the fourth light beam between the scanning device and the fourth light receiving member;

controllably adjusting a position of the third light transmissive plate using the adjusting device after scanning the fourth light beam across the fourth light receiving member; and rescanning the fourth light beam across the fourth light receiving member to form the fourth scan line, the rescanned fourth light beam passing through the adjusted third light transmissive plate to displace a location of the fourth scan line by a desired amount in a direction perpendicular to the fourth direction.

49. The method of claim 46, wherein the first light transmissive plate adjusting step comprises determining a velocity of at least the second light receiving member and automatically adjusting the position of the first light transmissive plate based on the determined velocity of the at least second light receiving member.

50. A method for registering scan lines in a raster scanning system, the system comprising a light receiving device for receiving a plurality of light beams and a scanning device that scans the plurality of light beams across the light receiving device to form a plurality of scan lines extending in a fast scan direction, the method comprising the steps of:

controllably adjusting a position of a first light transmissive plate located in a path of a first light beam between the scanning device and the light receiving device using an adjusting device, the adjusted position of the first light transmissive plate displacing a location of a first scan line on the light receiving device by a first desired amount in a direction perpendicular to the fast scan direction; and adjusting a position of a second light transmissive plate located in a path of a second light beam between the scanning device and the light receiving device, the adjusted position of the second light transmissive plate displacing a location of a second scan line on the light receiving device by a second desired amount in the direction perpendicular to the fast scan direction, the displaced location of the second scan line being in proper registration with the location of the first scan line.

51. The method of claim 50, wherein the first light transmissive plate adjusting step comprises determining a characteristic of the light receiving device and automatically adjusting the position of the first light transmissive plate based on the determined characteristic.

52. The method of claim 51, wherein the second light transmissive plate adjusting step comprises automatically adjusting the position of the second light transmissive plate based on the determined characteristic.

53. The method of claim 50, further comprising the step of adjusting a position of a third light transmissive plate located in a path of a third light beam between the scanning device and the light receiving device, the adjusted position of the third light transmissive plate displacing a location of a third scan line on the light receiving device by a third desired amount in the direction perpendicular to the fast scan direction.

54. The method of claim 53, further comprising the step of adjusting a position of a fourth light transmissive plate located in a path of a fourth light beam between the scanning device and the light receiving device, the adjusted position of the fourth light transmissive plate displacing a location of a fourth scan line on the light receiving device by a fourth desired amount in the direction perpendicular to the fast scan direction.

55. The method of claim 50, wherein the light receiving device comprises a belt receiving the first light beam and the second light beam on the belt.

56. The method of claim 50, wherein the light receiving device comprises a first photoreceptor and a second photoreceptor, and the method further comprising the step of receiving the first light beam on the first photoreceptor and a second phtotoreceptor receiving the second light beam on the second photoreceptor.

57. A raster scanning method comprising the steps of:

forming an initial scan line on a photoreceptor by scanning a light beam from a scanning device to the photoreceptor, the light beam passing through a light transmissive plate located in a path of the light beam between the scanning device and the photoreceptor, the initial scan line extending along a first direction of the photoreceptor;

controllably adjusting a displacement angle of the light transmissive plate using an adjusting device after forming the initial scan line; and scanning a subsequent scan line across the photoreceptor by passing a subsequent light beam through the light transmissive plate with the adjusted displacement angle, the subsequent scan line being displaced from the initial scan line in a direction perpendicular to the first direction, an amount of displacement of the second scan line being based on the adjusted displacement angle.

* * * * *